United States Patent

Iijima et al.

[11] Patent Number: 5,851,697
[45] Date of Patent: Dec. 22, 1998

[54] NEGATIVE ELECTRODE MATERIAL FOR LITHIUM SECONDARY CELL, METHOD FOR ITS PRODUCTION, AND LITHIUM SECONDARY CELL

[75] Inventors: Takashi Iijima; Kimihito Suzuki, both of Kawasaki; Maki Sato, Tokyo, all of Japan

[73] Assignee: Nippon Steel Corporation, Tokyo, Japan

[21] Appl. No.: 782,188

[22] Filed: Jan. 14, 1997

Related U.S. Application Data

[63] Continuation of Ser. No. 341,553, filed as PCT/JP93/00695 May 25, 1993, Pat. No. 5,622,793.

[30] Foreign Application Priority Data

May 25, 1992 [JP] Japan .................................. 4-156148

[51] Int. Cl.[6] ................................................. H01M 4/58
[52] U.S. Cl. ............................................................ 429/218
[58] Field of Search ............................................ 429/218

[56] References Cited

U.S. PATENT DOCUMENTS

| | | | |
|---|---|---|---|
| 4,668,595 | 5/1987 | Yoshino et al. | 429/194 |
| 4,980,250 | 12/1990 | Takahashi et al. | 429/218 |
| 5,069,683 | 12/1991 | Fong et al. | 429/218 |
| 5,153,082 | 10/1992 | Ogino et al. | 429/218 |
| 5,176,969 | 1/1993 | Miyabayashi et al. | 429/218 |
| 5,344,724 | 9/1994 | Ozaki et al. | 429/218 |

FOREIGN PATENT DOCUMENTS

| | | |
|---|---|---|
| 0346088 | 12/1989 | European Pat. Off. |
| 1-292753 | 11/1989 | Japan. |
| 2-54866 | 2/1990 | Japan. |
| 2-82466 | 3/1990 | Japan. |
| 2247771 | 3/1992 | United Kingdom. |

OTHER PUBLICATIONS

International Search Report, PCT/JP93/00695 No Date Available.
International Preliminary Examination Report, (English Translation), for PCT/JP93/00695 No Date Available.
Patent Abstracts of Japan, vol. 14, No. 263 (E–938) dated Jun. 7, 1990.
European Search Report for EP 93 91 0392 Apr. 7, 1995.

Primary Examiner—Stephen Kalafut
Assistant Examiner—Carol Chaney
Attorney, Agent, or Firm—Kenyon & Kenyon

[57] ABSTRACT

A negative electrode material for a lithium secondary cell comprises carbonaceous particles consisting essentially of carbon fiber particles prepared by pulverizing pitch-based carbon fibers, wherein the layer spacing d between the carbon layers is less than 0.338 nm, the average particle size is 5–200 μm, the fiber diameter of the pitch-based carbon fibers is 5–30 μm, and the aspect ratio of the carbon fiber particles is 100 or less, the layer spacing d determined based on X-ray diffraction of the carbon fiber particles. A lithium secondary cell contains such a negative electrode material.

4 Claims, 3 Drawing Sheets

NEGATIVE ELECTRODE MATERIAL FOR LITHIUM SECONDARY CELL, METHOD FOR ITS PRODUCTION, AND LITHIUM SECONDARY CELL

This is a continuation of application Ser. No. 08/341,553 filed on Jan. 13, 1995 which is a 35 U.S.C. §371 of PCT/JP93/00695 filed May 25, 1993, now U.S. Pat. No. 5,622,793.

FIELD OF THE INVENTION

The present invention relates to carbonaceous negative electrode materials for a lithium secondary cell which are prepared by a lithium doping/undoping (de-doping) reaction, to methods for their production, and to a lithium secondary cell. More specifically, it relates to carbonaceous materials, especially particulate electrode materials.

BACKGROUND ART

The trend in recent years toward smaller and lighter electronic devices has strengthened the demand for high-energy densification of secondary cells. Lithium secondary cells have been receiving attention as high-energy densified secondary cells aimed at meeting this demand, and they have been undergoing rapid development.

The main problem faced in the development of these lithium secondary cells is that the lithium metal used as the negative electrode undergoes deterioration with repeated charging and discharging. This is a result of the state of the lithium metal as it is deposited on the negative electrode during charging; for example the dendrite, which is a dendritic crystal, causes delamination from the negative electrode plate or short-circuiting with the opposing electrode.

In order to overcome these problems, a variety of different negative electrode materials comprising lithium alloys and doped/undoped lithium have been proposed and tested.

However, problems remain with lithium alloys, in that deep charging and discharging is difficult, they are not suitable for charging and discharging with a high current density, etc. On the other hand, carbon materials and electrically conductive polymers have also been proposed as lithium doping materials, but remaining problems with such electrically conductive polymers include that they have low doping ratios, and that they are chemically and electrically unstable with lithium. At present, most attention is being directed to carbon materials as lithium metal substitutes for the negative electrodes of lithium secondary cells.

When a carbon material is used as the negative electrode of a lithium secondary cell, lithium is intercalated between layers of the carbon material in the electrolyte solution during charging, to form what is known as a graphite intercalation compound. Also, during discharge the interlayer lithium is discharged into the electrolyte solution. Thus, in principle, the use of a carbon material makes it possible to eliminate the deterioration of the negative electrode which accompanies the charge/discharge cycle of the dendrite, etc. that occurs when lithium metal is used as the negative electrode.

Such carbon materials for lithium secondary cell negative electrodes that have been studied include thin-film carbonaceous electrodes prepared by CVD techniques (Japanese Unexamined Patent Application No. 63-24555, etc.), coke powder (Japanese Unexamined Patent Application Nos. 1-204361 and 1-221859) and resins and other carbonized polymers (Proc. Prim. Second. Amb. Temp. Lithium Batteries, p.530–539).

Nevertheless, the above-mentioned carbon materials presently have a small electrical capacity per unit weight. The electrical capacity corresponds to the amount of lithium inserted into the carbon material. Although the amount of inserted lithium is theoretically limited to a maximum of one lithium atom per 6 atoms of carbon ($C_6Li$, 372 mAh/g), in practice it has been found that the carbon materials described above can exhibit a capacity of no more than about 250 mAh/g (see, for 12 example, Proceedings of the 31st Battery Simposium in Japan, 3B11 (1990); and Proceedings of the 32nd Battery Simposium in Japan, 2B12 (1992)).

There are also examples of carbon fibers being employed as electrodes (Japanese Unexamined Patent Application Nos. 63-268056, 62-268058, 63-10462, 64-14869), but because of their filamentous shape, the formation density cannot be improved and thus it has been impossible to increase their volume density when employed in an electrode.

Here, the present inventors have found, as a result of diligent research aimed at developing a carbon material with a high cycle stability for repeated charging and discharging, that the shape of the carbon material is a particularly important factor, with a filamentous shape being the most suitable, and that by adjusting the degree of graphitization and the shape of a particulate carbon material prepared by pulverizing carbon fibers derived from pitch, a very high effectiveness may be achieved from the viewpoint of increasing the lithium doping ratio and initial charge/discharge efficiency, and the present invention has been completed based upon this finding.

Consequently, it is an object of the present invention to develop a carbon material with a large lithium doping ratio and a high charge/discharge efficiency, as well as a method for its production.

It is another object of the present invention to provide a material for the negative electrode of a lithium secondary cell which has a large discharge capacity and a long cycle life as a result of the above-mentioned excellent lithium doping ratio and charge/discharge efficiency, as well as a lithium secondary cell which employs this negative electrode material.

DISCLOSURE OF THE INVENTION

In other words, the present invention provides a negative electrode material for a lithium secondary cell, which consists of carbonaceous particles composed primarily of carbon fiber particles prepared by pulverizing pitch-based carbon fibers, wherein the layer spacing d between the carbon layers is 0.338 nm or less as determined based on x-ray diffraction and the average particle size is 5–200 $\mu$m as well as a lithium secondary battery which employs this type of negative electrode material.

In addition, the present invention provides a method for producing a material for lithium secondary cell negative electrodes composed of carbon fiber particles wherein the distance d between the carbon layers is 0.338 nm or less as determined based on X-ray diffraction, and the average particle size is 5–200 $\mu$m, which method comprises heat-treating pitch fibers at 800°–2,600° C. to make carbon fibers, pulverizing the fibers to obtain pulverized carbon fibers, and then heat-treating them again at a temperature greater than that of the heat treatment temperature prior to pulverization.

The carbon material for lithium secondary cell negative electrodes according to the present invention is prepared by pulverizing carbon fibers derived from pitch, and it has a high degree of graphitization, a controlled particle size, a large lithium doping ratio and a high charge/discharge efficiency.

Furthermore, according to the method of the present invention it is possible to produce a particulate carbon material which exhibits no loss of the electrode properties of the carbon fibers, and in particular it is possible to produce a particulate carbon material for lithium secondary battery negative electrodes which has a high initial charge/discharge efficiency (undoping/doping ratio) and a long cycle life.

BEST MODE FOR CARRYING OUT THE INVENTION

It is important that the starting spinning pitch used to produce the pitch-based carbon fibers according to the present invention achieve graphite crystallinity readily upon heat treatment, i.e. that it be readily graphitizable, and there are no particular restrictions on the starting pitch so long as it is readily graphitizable. As examples there may be mentioned petroleum pitch, asphalt pitch, coal tar pitch, crude cracking pitch, petroleum sludge pitch, and pitch obtained by thermal cracking of high polymers, and these pitches may subjected to hydro-cracking as well.

The optical anisotropic phase, or "mesophase" is used as an index to express the degree to which the starting pitch is readily graphitizable, and the pitch used according to the present invention has a volume content in this mesophase of 70% or greater, preferably 80% or greater and even more preferably 90% or greater.

Pitch fibers obtained by spinning this type of starting pitch are heat-treated normally at a temperature of 800°–2,600° C., and preferably 1,000°–2,500° C., to make carbon fibers. By heat-treating within these temperature ranges, the resulting carbon fibers have high mechanical strength, and defects in the texture of the carbon fibers during the pulverization of the carbon fibers, i.e. cracks in the surface of the fibers, structural damage inside the fibers, and other such macrodamage may be kept to a minimum.

The fiber size (diameter) of the carbon fibers prepared in this manner is preferably about 5–30 $\mu$m, and more preferably about 5–15 $\mu$m. If the size of the carbon fibers exceeds 30 $\mu$m, there is more damage to the shape of the fibers themselves and other such defects occurring during the subsequent pulverization step, and even with heat-treating after the pulverization, the resulting carbon fiber particles have low electrode properties. Furthermore, in cases where the diameter of the carbon fibers is less than 5 $\mu$m, such a thin fiber diameter results in a low degree of graphite crystalline structure even with graphitization at high temperatures, and consequently the capacity thereof is lowered.

The prepared carbon fibers are then pulverized to prepare pulverized carbon fibers, which are then heat-treated again at a temperature greater than the heat treatment temperature prior to pulverization.

The pulverizer used for pulverization of the carbon fibers ideally shears the fibers in the lengthwise direction to maintain their cylindrical shape, and there are no particular restrictions on the type of pulverizer so long as this condition is met. For example, an abrasion pulverization ball mill, an impact pressure pulverization vibrating disk mill, a vibrating ball mill, a jet mill, a shear pulverization cutting mill, etc. may be used.

It is believed that heat treatment of the pulverized carbon fibers results in rearrangement of the crystalline structure, thus restoring any defects generated during the pulverization process. The temperature for heat-treating of the pulverized carbon fibers must be no less than the heat treatment temperature prior to the pulverization, but in order to obtain stable electrode properties it is preferably 2,000° C. or higher, and more preferably 2,600° C. or higher. By heat-treating the pulverized carbon fibers in this manner, it is possible to minimize the effect of defects in the texture of the carbon fibers during the above-mentioned pulverization process.

The carbon fiber particles according to the present invention obtained in this manner have a degree of graphitization in terms of the carbon layer spacing d of 0.338 nm or less, and preferably 0.337 nm or less, as determined based on X-ray diffraction, to allow a larger electrical capacity, i.e. lithium doping ratio, and to increase the charge and discharge efficiency. The measurement of the degree of graphitization by X-ray diffraction is performed using CuK$\alpha$ as the X-ray source and high-purity silicone as the standard substance, measuring the 002 diffraction pattern of the carbon material, and finally calculating the lattice spacing d from the positions of the peaks. A method for calculating the lattice spacing d is described in, for example, "Carbon Fibers", p.701–709 (Kindai Henshuu, published March 1986).

Also, regarding the size and shape of the carbon fiber particles, the average particle size (essentially the fiber length) is 5–200 $\mu$m, and preferably 8–100 $\mu$m. If the average particle size is over 200 $\mu$m it becomes difficult for the lithium to be inserted inside the carbon fibers, and thus the utilization factor of the carbon fibers is lowered. Conversely, if the average particle size is less than 5 $\mu$m, the properties of the fibers are not brought out.

The average particle size described above may be measured by the light scattering method applying the scattering theory of Mie [G. Mie, Ann. Physik., 25, 377(1908)] using a particle size analyzer, and for example a Silas laser-diffraction particle size analyzer series may be used, which expresses the average particle size as a weight average.

In addition, the aspect ratio of the carbon fiber particles is 100 or less, and preferably 70 or less. Fibers with an aspect ratio greater than 100 have poor moldability, and poorer cycling properties for repeated charging and discharging of the resulting electrode.

The carbon fiber particles of the present invention may be used in combination with carbonaceous particles so long as they are capable of undergoing repeated lithium doping and de-doping reactions. As such types of carbonaceous particles there may be mentioned, for example, those which have attained a highly graphite crystalline structure, such as natural graphite particles or artificial graphite particles; readily graphitizable carbon particles such as coke particles, etc.; and poorly graphitizable carbonaceous particles obtained by carbonizing resins such as phenol resins and furan resins. In order to maintain the electrode properties of the carbon fiber particles of the present invention, the mixing ratio of the above-mentioned carbonaceous particles is preferably 60 wt % or less and more preferably 40 wt % or less, and the average particles size thereof is preferably 300 $\mu$m or less, and more preferably 100 $\mu$m or less.

Furthermore, a current collector material may be used to more efficiently bring out the performance of the carbon fiber particles. The current collector material is preferably a metal with high electrical conductivity, high electrochemical stability and corrosion resistance, examples of which include copper, aluminum, stainless steel, and the like.

The shape of the electrode may be determined in accordance with the cell structure. For example, it may be molded by application and drying, or pressure adhesion, onto a metal lattice or metal foil, or a pellet-shaped electrode may be formed by press working.

The carbon fiber particles of the present invention may be molded by a commonly used method with a particulate cell active material to be used as the positive electrode of a lithium secondary cell, for instance, an inorganic compound such as $LiCoO_2$. For example, a fluorine-based resin such as polytetrafluoroethylene, polyvinylidene fluoride or the like may be used as a binder for the molding, and other materials may be used so long as the binder itself does not contribute to the reaction at the negative electrode, is electrochemically and chemically stable, and is highly capable of molding the particles. The amount of the binder is preferably 10 wt % or less, since large binder amounts are associated with lower volume energy densities of electrodes.

In addition, the carbon fiber particles of the present invention may be used in appropriate combination with a positive electrode and an organic solvent system electrolyte solution, and the organic solvent system electrolyte solution and positive electrode are not particularly restricted provided that they are common types used for lithium secondary cells.

As the positive electrode material there may be used, for example, a lithium-containing metal oxide ($Li_xMO_2$:M=one of Co, Ni, Mn), a transition metal chalcogenide, vanadium oxide ($V_2O_5$, $V_6O_{13}$), a Chevrel phase compound or activated carbon.

In addition, as organic solvents for the electrolyte solution there may be mentioned propylene carbonate, ethylene carbonate, 1,2-dimethoxyethane, 1,2-diethoxyethane, $\gamma$-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, diethylene carbonate and dimethylsulfoxide, of which one or a combined mixture may be used.

Also, as electrolytes for the electrolyte solution there may be mentioned $LiClO_4$, $LiBF_4$, $LiAsF_6$, $LiPF_6$, $LiB(C_6H_5)_4$, $LiCF_3SO_3$, LiBr, LiCl, etc.

The carbon fiber particles of the present invention are usually constructed opposite a positive electrode via a separator, but there are no restrictions on the shape of the cell to which they are applied. For example, they may be applied to button-shaped cells, coin-shaped cells, square-shaped cells with multiply layered electrodes, and cylindrically-shaped cells with electrode sheets wrapped in a spiral.

The carbon fiber particles to be used as the negative electrode material for a lithium secondary battery according to the present invention are fibrous and have a high degree of graphitization, and thus it is possible to avoid macro-structural damage to the material even if the carbon layer spacing expands and contracts along with the insertion and de-insertion loss of the lithium when used as the negative electrode material of the lithium secondary cell. Furthermore, when these carbon fiber particles are used in a negative electrode material for a lithium secondary cell, they improve the diffusion rate of the lithium atoms in the negative electrode material as well as the surface area of the negative electrode material available for lithium insertion, i.e. the reaction active surface area, thus providing an improved electrical capacity, or lithium doping ratio. Also, the carbon fiber particles whose fiber surface consists of a carbon plane edge have a very high charge/discharge efficiency at the first cycle, and the charge/discharge efficiency is roughly 100% during the first 10 cycles. Consequently, the pitch-based carbon fiber particles of the present invention which have a very high degree of graphitization are appropriate as materials for the negative electrode of a lithium secondary cell.

EXAMPLES

The present invention will now be explained in detail based on the following examples and comparative examples.

Example 1

Carbon fibers (post-spinning fiber diameter: 13 $\mu$m) made from coal tar pitch with a mesophase content of 90% (volume fraction) as the starting material were heated to 1,000° C., 1,250°C., 1,500° C., 1,750° C., 2,000° C., 2,200° C. and 2,400° C. at a temperature elevating rate of 10° C. per minute, and carbon fibers were obtained by carbonization for 1 hour at each of these temperatures.

Each of the obtained carbon fiber specimens were pulverized with a vibrating disk mill, after which the pulverized carbon fibers were reheated to 2,900° C. for 1 hour at a rate of 10° C. per minute, and kept at that temperature for graphitization.

The degree of graphitization d (nm) based on X-ray diffraction, average particle size ($\mu$m) and maximum aspect ratio of the carbon fiber particles obtained in this manner were measured. The results are given in Table 1. The fiber diameter of the carbon fibers after graphitization was about 10 $\mu$m.

TABLE 1

| Heat treatment temperature prior to pulverization (°C.) | Layer spacing d (nm) | Average particle size ($\mu$m) | Maximum aspect ratio |
|---|---|---|---|
| 1,000 | 0.3378 | 12.5 | <15 |
| 1,250 | 0.3376 | 12.7 | <15 |
| 1,500 | 0.3376 | 12.2 | <15 |
| 1,750 | 0.3375 | 11.9 | <15 |
| 2,000 | 0.3375 | 11.9 | <15 |
| 2,200 | 0.3375 | 11.2 | <10 |
| 2,400 | 0.3376 | 11.0 | <10 |

To the carbon fiber particles obtained in this manner was added 5 wt % of polytetrafluoroethylene as a binder, and the fibers were kneaded using isopropyl alcohol and subjected to pressure adhesion on a nickel mesh (250 mesh), to mold a 10.53 mg (10 mg in terms of carbon material) electrode with a thickness of about 0.1 mm.

Figure 1:
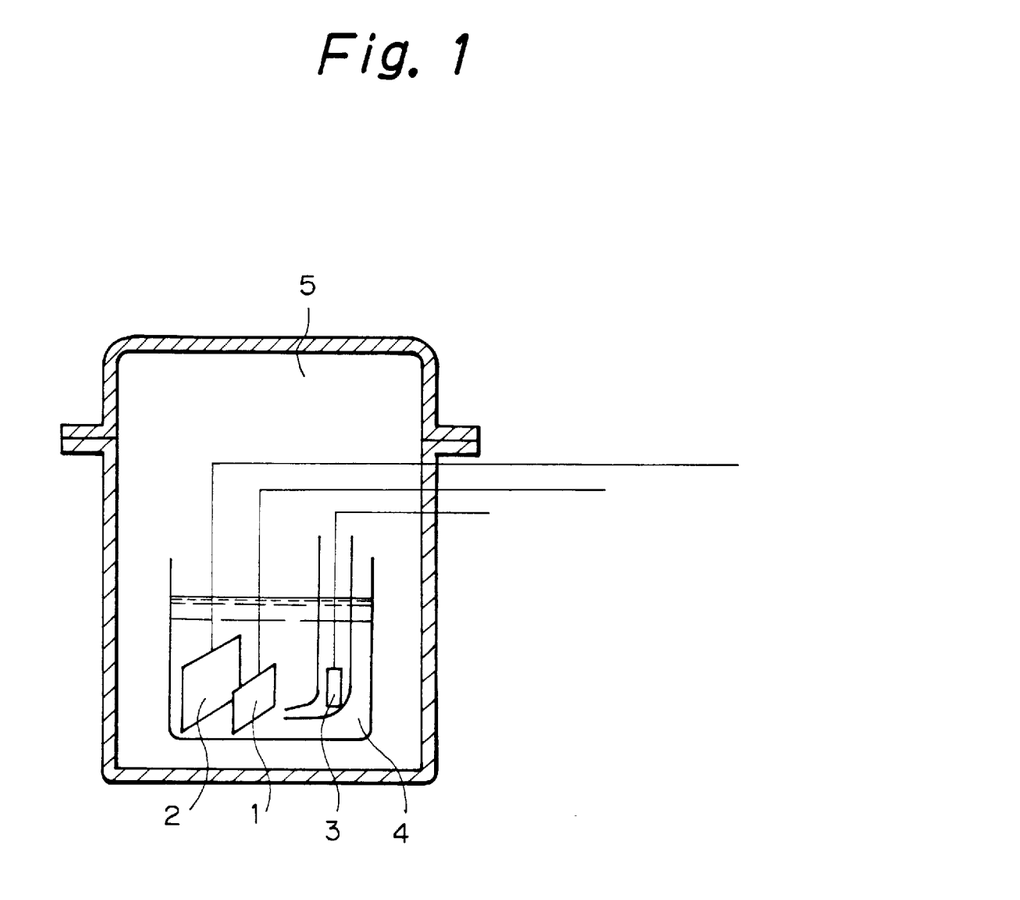
FIG. 1 is an illustrative sectional view of a three electrode cell prepared for evaluation of the electrode properties in Example 1.

Referring to FIG. 1, in order to evaluate the electrode properties of this molded electrode 1, a so-called three electrode cell was prepared using lithium metal for both the counter electrode 2 and the reference electrode 3. The electrolyte solution 4 was prepared by dissolving $LiClO_4$ to a concentration of one mole/liter in a mixed solvent of ethylene carbonate and propylene carbonate (volumetric mixing ratio=1:1), and the entire three electrode cell was placed in an argon atmosphere 5.

For the charge/discharge test, both the charging and discharging were performed with a constant current (0.3 mA/10 mg of carbon fiber powder) using potential regulation. The potential range was 0 to 1.0 V (lithium metal standard).

The results of evaluation of the electrode properties are given in Table 2.

TABLE 2

| Heat treatment temperature prior to pulverization (°C.) | Discharge capacity (mAh/g) | | Charge/discharge efficiency (%) | |
|---|---|---|---|---|
| | 1st cycle | 100th cycle | 1st cycle | 10th cycle |
| 1,000 | 258 | 240 | 83 | 100 |
| 1,250 | 264 | 245 | 84 | 100 |
| 1,500 | 266 | 248 | 85 | 100 |
| 1,750 | 264 | 249 | 85 | 100 |
| 2,000 | 268 | 255 | 85 | 100 |
| 2,200 | 262 | 253 | 84 | 100 |
| 2,400 | 258 | 248 | 83 | 100 |

As is clear from the results shown in Table 2, all of the carbon fiber particles exhibited very satisfactory results, having high values of initial capacity of 258–268 mAh/g and initial charge/discharge efficiency of 83–85%, while there was little cycle deterioration of the discharge capacity.

Figure 2:
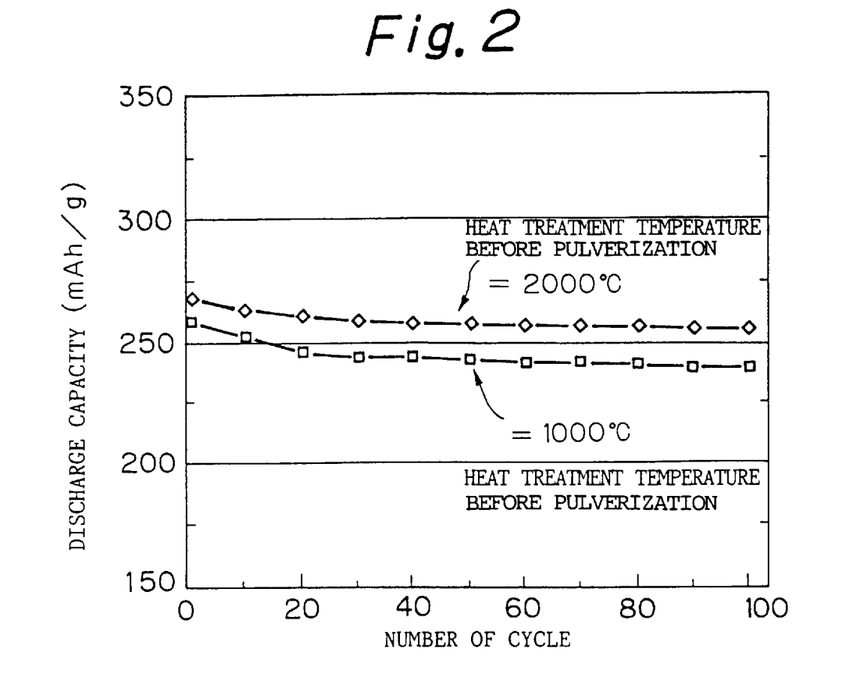
FIG. 2 is a graph showing the relationship between discharge capacity and number of cycles for carbon fiber particles obtained at pre-pulverization heat treatment temperatures of 1,000° C. and 2,000° C. in Example 1.

Also, FIG. 2 shows the changes in the discharge capacities with continuing cycles, for carbon fiber particle electrodes heat treated at temperatures of 1,000° C. and 2,000° C. prior to pulverization.

Example 2

Pitch fibers (post-spinning fiber diameter: 13 μm) made from coal tar pitch with a mesophase content of 95% (volume fraction) as the starting material were heated to 2,000° C. at a temperature elevating rate of 10° C. per minute, kept for 1 hour at this temperature, and then pulverized with a vibrating disk mill.

The pulverized carbon fibers obtained by this pulverization were then graphitized at 2,800° C., 3,000° C. and 3,200° C. to obtain carbon fiber particles. The degree of graphitization d (nm) based on X-ray diffraction, average particle size (μm) and maximum aspect ratio of the carbon fiber particles obtained in this manner were measured. The results are given in Table 3.

The obtained carbon fiber particles were subjected to molding by the same method as in Example 1 to prepare negative electrodes, and three electrode cells were prepared in the same manner as in Example 1 for evaluation of the electrode properties. The results are given in Table 4.

TABLE 3

| Heat treatment temperature prior to pulverization (°C.) | Layer spacing d (nm) | Average particle size (μm) | Maximum aspect ratio |
|---|---|---|---|
| 2,800 | 0.3378 | 11.2 | <10 |
| 3,000 | 0.3371 | 11.2 | <10 |
| 3,200 | 0.3366 | 11.2 | <10 |

TABLE 4

| Graphitization temperature (°C.) | Discharge capacity (mAh/g) | | Charge/discharge efficiency (%) | |
|---|---|---|---|---|
| | 1st cycle | 100th cycle | 1st cycle | 10th cycle |
| 2,800 | 260 | 242 | 85 | 100 |
| 3,000 | 294 | 282 | 82 | 100 |
| 3,200 | 323 | 316 | 79 | 100 |

The capacity increased with higher heat treatment temperatures after pulverization, i.e. higher degrees of graphitization, and in particular the carbon fiber particles treated at 3,200° C. had a very large discharge capacity of 323 mAh/g, and the properties did not notably deteriorate even after 100 cycles.

Figure 3:
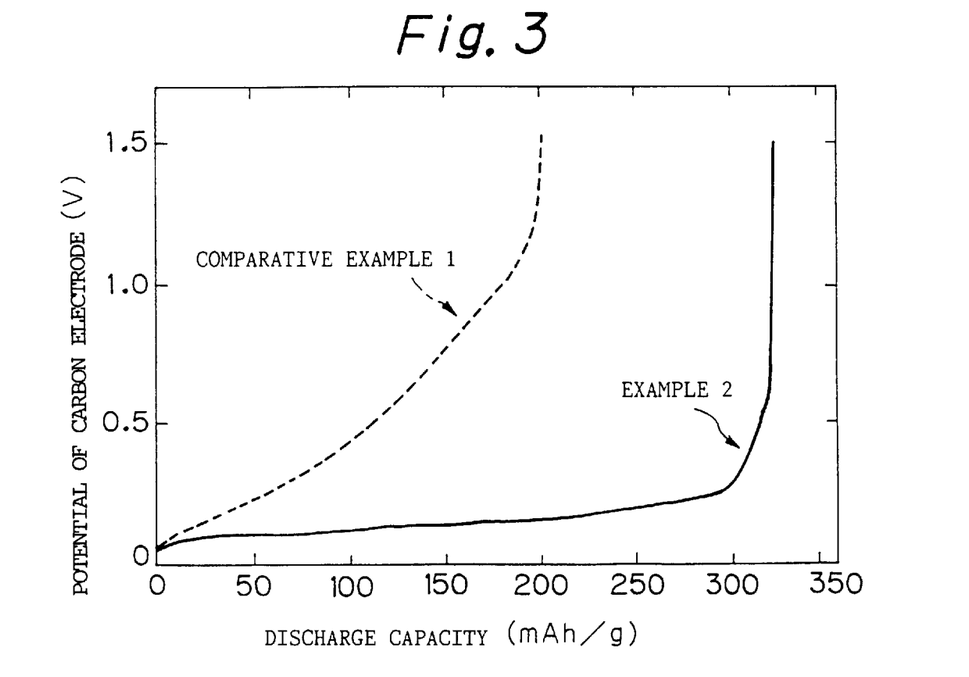
FIG. 3 is a graph showing the discharge curve for the graphitizing temperature of 3,200° C. in Example 2 (solid line) and the discharge curve for the PAN-based carbon fibers in Comparison 1 (broken line).

Also, FIG. 3 shows the discharge curve at the 10th cycle using carbon fiber particles heat-treated at 3,200° C.

Example 3

The pitch fibers used in Example 2 were heat-treated at 1,700° C. for one hour and then pulverized with a vibrating disk mill. The weight of the carbon fibers loaded into the pulverizer was 5 g, and the pulverizing was carried out for 15, 25, 40 and 60 seconds to prepare 4 types of carbon fiber particles.

These pulverized carbon fibers were heat-treated again at 3,200° C. for one hour for graphitization, and the degree of graphitization d (nm) based on X-ray diffraction, average particle size (μm) and maximum aspect ratio of the carbon fiber particles obtained in this manner were measured. The results are given in Table 5.

Using the obtained carbon fiber particles, three electrode cells were prepared for evaluation of the electrode properties in the same manner as in Example 1 above, except that the electrolyte solution was prepared by dissolving $LiClO_4$ to a concentration of one mole/liter in a mixed solvent of ethylene carbonate and dimethoxyethane (volumetric mixing ratio=1:1). The results are given in Table 6. All of the prepared specimens had large discharge capacities and high cycle stabilities.

TABLE 5

| Treatment time (sec) | Layer spacing d (nm) | Average particle size (μm) | Maximum aspect ratio |
|---|---|---|---|
| 15 | 0.3365 | 14.2 | <20 |
| 25 | 0.3365 | 13.1 | <15 |
| 40 | 0.3365 | 12.3 | <10 |
| 60 | 0.3367 | 10.8 | <7 |

TABLE 6

| Pulverizing time (sec) | Discharge capacity (mAh/g) | | Charge/discharge efficiency (%) | |
|---|---|---|---|---|
| | 1st cycle | 100th cycle | 1st cycle | 10th cycle |
| 15 | 312 | 306 | 86 | 100 |
| 25 | 315 | 308 | 83 | 100 |
| 40 | 320 | 312 | 82 | 100 |
| 60 | 310 | 302 | 78 | 100 |

Example 4

The pitch fibers used in Example 2 were heat-treated at 2,200° C. for one hour and then pulverized with a vibrating disk mill. The weight of the carbon fibers loaded into the pulverizer was 30 g, and the pulverizing was carried out for 20, 40 and 60 seconds to prepare 3 types of carbon fiber particles.

These carbon fiber particles were heat-treated again at 3,200° C. for one hour for graphitization, and the degree of graphitization d (nm) based on X-ray diffraction, average particle size ($\mu$m) and maximum aspect ratio of the obtained carbon fiber particles were measured. The results are given in Table 7.

TABLE 7

| Treatment time (sec) | Layer spacing d (nm) | Average particle size ($\mu$m) | Maximum aspect ratio |
|---|---|---|---|
| 20 | 0.3367 | 75 | <70 |
| 40 | 0.3367 | 60 | <50 |
| 60 | 0.3367 | 50 | <40 |

Using the obtained carbon fiber particles, three electrode cells were prepared for evaluation of the electrode properties in the same manner as in Example 1 above, except that the electrolyte solution was prepared by dissolving LiClO$_4$ to a concentration of one mole/liter in a mixed solvent of ethylene carbonate and propylene carbonate (volumetric mixing ratio=1:1). The results are given in Table 8. All of the prepared specimens had large discharge capacities and high cycle stabilities.

TABLE 8

| Pulverizing time (sec) | Discharge capacity (mAh/g) | | Charge/discharge efficiency (%) | |
|---|---|---|---|---|
| | 1st cycle | 100th cycle | 1st cycle | 10th cycle |
| 20 | 303 | 293 | 83 | 100 |
| 40 | 304 | 290 | 84 | 100 |
| 60 | 305 | 289 | 83 | 100 |

Example 5

To the carbon fiber particles prepared in Example 3 which had been pulverized for 25 seconds there was added 10 wt % of polyvinylidene fluoride, and the fibers were kneaded using dimethylformamide, and applied onto copper foil (20 $\mu$m thickness) and then dried at 50° C. to make an electrode. This was cut to a suitable shape and used as a negative electrode. Also, 10 wt % of polytetrafluoroethylene and 5 wt % of ketchen black were added to LiCoO$_2$, and kneading with isopropyl alcohol was followed by pressure adhesion on a nickel mesh (250 mesh) to make an electrode which was used as the positive electrode.

The thickness of the electrodes used were about 1.5 mm for the positive electrode and about 0.8 mm for the negative electrode, and the separator had a thickness of about 0.1 mm.

Figure 4:
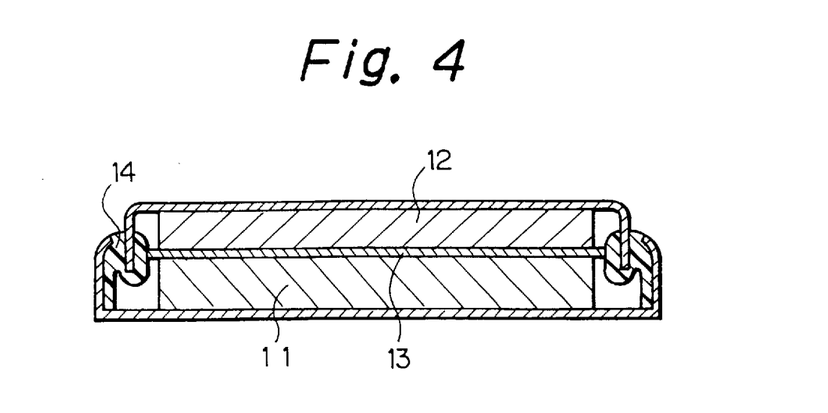
FIG. 4 is an illustrative sectional view of the coin-shaped cell in Example 5.

Referring to FIG. 4, the positive electrodes 11 and the negative electrode 12 prepared in the manner described above were used, with an electrolyte solution prepared by dissolving LiClO$_4$ to a concentration of one mole/liter in a mixed solvent of ethylene carbonate and propylene carbonate (volumetric mixing ratio=1:1), a polypropylene non-woven cloth as the separator 13, and a polypropylene sealant for sealing, to prepare a simple coin-shaped cell (diameter: 20 mm, thickness approx. 2.8 mm).

This simple coin-shaped cell was subjected to a charge/discharge test. The electrochemical equivalent ratio of the positive electrode active substance and the negative electrode active substance was adjusted for the relationship (positive electrode >>negative electrode), and the construction provided negative electrode regulation. For the charge/discharge test, both the charging and discharging were performed with a constant current (30 mA per gram of carbon fiber particles), and the charging and discharging was repeated between cell voltages of 3 V to 4 V and 3 V to 4.1 V. The results are given in Table 9.

TABLE 9

| Voltage range (V) | Discharge capacity (mAh/g) | | Charge/discharge efficiency (%) | |
|---|---|---|---|---|
| | 1st cycle | 100th cycle | 1st cycle | 10th cycle |
| 3–4.0 | 285 | 275 | 78 | 100 |
| 3–4.1 | 303 | 294 | 81 | 100 |

* = Discharge capacity per gram of carbon fiber particles

Figure 5:
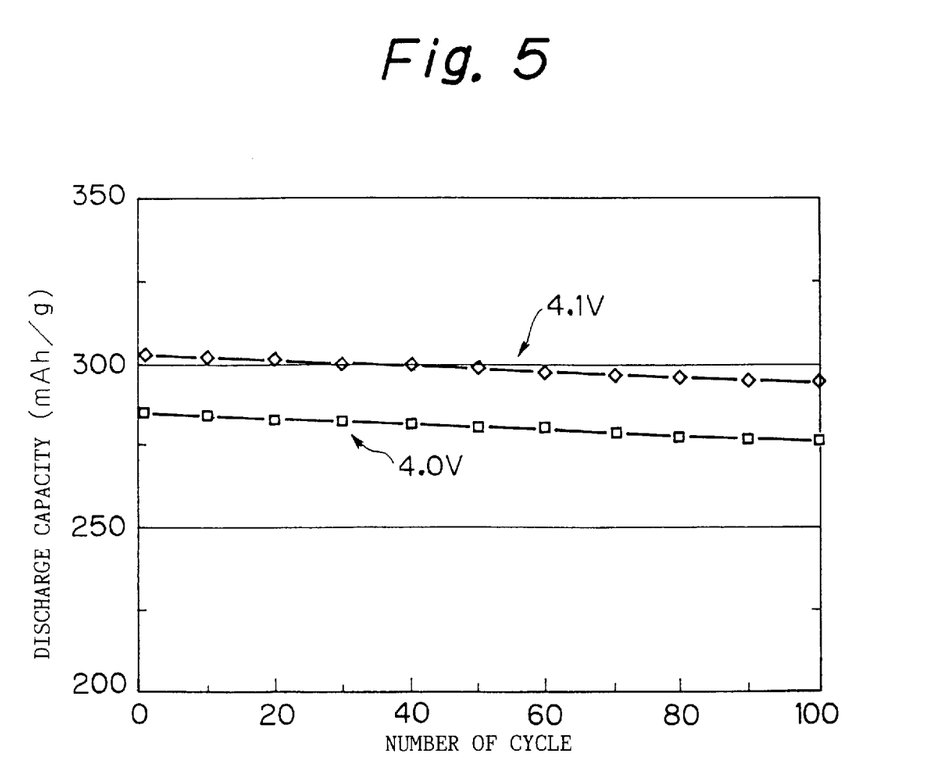
FIG. 5 is a graph showing the relationship between discharge capacity and number of cycles for the coin-shaped cell in Example 5.

FIG. 5 shows the changes in the discharge capacities with continuing cycles changes. In all of the voltage ranges, there was no lowering of the capacity even after 100 cycles, and the charge/discharge efficiency increased to 100% from 5 cycles onward.

Comparative Example 1

PAN-based carbon fibers (T300B of Tore Co.) were used as the carbon fibers. MEK was used to surface treat the carbon fibers, which were then pulverized with a vibrating disk mill. The degree of graphitization d (nm) based on X-ray diffraction, average particle size ($\mu$m) and maximum aspect ratio of the obtained carbon fiber particles were measured. The results are given in Table 10.

TABLE 10

| Layer spacing d (nm) | Fiber diameter ($\mu$m) | Average particle size ($\mu$m) | Maximum aspect ratio |
|---|---|---|---|
| 0.3549 | 7.9 | 9.2 | <15 |

To the pulverized carbon fibers obtained in this manner was added 5 wt % of polytetrafluoroethylene, and the fibers were kneaded using isopropyl alcohol and subjected to pressure adhesion on a nickel mesh (250 mesh) to make an electrode.

A three electrode cell was prepared with lithium metal as the counter electrode and standard electrode, to determine the electrode properties of the carbon material as a single electrode. The electrolyte solution was prepared by dissolving LiClO$_4$ to a concentration of one mole/liter in a mixed solvent of ethylene carbonate and dimethoxyethane (volumetric mixing ratio=1:1). The electrode test was performed with a constant current (30 mA per gram of carbon material), and repeated charging and discharging. The results are given in Table 11.

TABLE 11

| Discharge capacity (mAh/g) | | Charge/discharge efficiency (%) | |
|---|---|---|---|
| 1st cycle | 20th cycle | 1st cycle | 10th cycle |
| 230 | 112 | 44 | 98 |

As shown clearly by the results in Table 11, the initial capacity was 230 mAh/g, and the initial charge/discharge efficiency was very low at 44%. With repeated charging and discharging, the capacity decreased sharply, decreasing to half after 20 cycles.

FIG. 2 shows a discharge curve for the 5th cycle.

Comparative Example 2

A three electrode cell was prepared to evaluate electrode properties in the same manner as in Example 1, using carbon fiber particles pulverized after carbonization at 1,500° C. and carbon fiber particles further graphitized at 2,400° C. thereafter. The results are given in Table 12. The carbon fiber particles graphitized at 2,400° C. had the degree of graphitization shown by d=0.3405 nm.

TABLE 12

| Sample | Discharge capacity (mAh/g) | | Charge/discharge efficiency (%) | |
|---|---|---|---|---|
| | 1st cycle | 100th cycle | 1st cycle | 10th cycle |
| No heat treatment | 215 | 187 | 73 | 100 |
| Treatment at 2,400° C. | 238 | 230 | 83 | 100 |

As is clear from Table 10, although the initial charge/discharge efficiency and cycle stability are improved by heat-treating again at a high temperature after pulverization, the discharge capacity does not increase very much with a low degree of graphitization.

[Industrial Applicability]

Lithium secondary cells are basically characterized by having high energy densities, and a lithium secondary cell employing a carbon material according to the present invention as the negative electrode is characterized by having a high lithium doping ratio, a high charge/discharge efficiency, and particularly a high initial charge/discharge efficiency (undoping ratio/doping ratio) with a long cycle life; consequently, it may be suitably used in electronic devices such as video cameras, pocket telephones and notebook computers, as well as in other devices.

We claim:

1. A negative electrode material for a lithium secondary cell, which comprises carbonaceous particles consisting essentially of carbon fibers prepared by pulverizing pitch-based carbon fibers, wherein the layer spacing d between the carbon layers, as determined by X-ray diffraction, is less than 0.338 nm, the average particle size is 5–200 μm, the fiber diameter of said pitch-based carbon fibers is 5–30 μm, and the aspect ratio of said carbon fibers is greater than 1 to 100.

2. The negative electrode material for a lithium secondary cell according to claim 1, wherein the fiber diameter of said pitch-based carbon fibers is 5–30 μm, and regarding said carbon fiber particles, the layer spacing d between the carbon layers is 0.337 nm or less, the average particle size is 8–100 μm, and the aspect ratio is 70 or less.

3. A lithium secondary cell, which comprises a compartment which contains a positive electrode, a negative electrode and an electrolyte containing a lithium salt, between the positive and negative electrodes, wherein said negative electrode comprises carbon fibers prepared by pulverizing pitch-based carbon fibers, and wherein the layer spacing d between the carbon layers, as determined by x-ray diffraction, is less than 0,338 nm, the average particle size is 5–200 μm, the fiber diameter of said pitch-based carbon fiber is 5–30 μm, and the aspect ratio of said carbon fibers is greater than 1 to 100.

4. The lithium secondary cell according to claim 3, wherein the fiber diameter of said pitch-based carbon fibers is in the range of 5–30 μm, and regarding said carbon fiber particles, the layer spacing d between the carbon layers is 0.337 nm or less, the average particle size is 8–100 μm, and the aspect ratio is 70 or less.

* * * * *

UNITED STATES PATENT AND TRADEMARK OFFICE
CERTIFICATE OF CORRECTION

PATENT NO. : 5,851,697
DATED : December 22, 1998
INVENTOR(S) : Takashi IIJIMA, et al.

It is certified that error appears in the above-identified patent and that said Letters Patent is hereby corrected as shown below:

Column 2, line 11, delete "12" between "for" and "example.".

Column 2, line 12, change "Simposium" to --Symposium--.

Column 2, line 13, change "Simposium" to --Symposium--.

Column 3, line 43, insert --be-- after "may".

Column 10, line 7, change "electrodes" to --electrode--.

Column 12, line 3, delete the brackets around "Industrial Applicability".

Column 12, line 37, change "x-ray" to --X-ray--.

Signed and Sealed this

Seventh Day of September, 1999

Attest:

Q. TODD DICKINSON

Attesting Officer

Acting Commissioner of Patents and Trademarks